(12) United States Patent
Hoshi

(10) Patent No.: US 8,101,096 B2
(45) Date of Patent: Jan. 24, 2012

(54) CONDUCTIVE RUBBER MEMBER

(75) Inventor: Junya Hoshi, Tokyo (JP)

(73) Assignee: Synztec Co., Ltd., Tokyo (JP)

(*) Notice: Subject to any disclaimer, the term of this patent is extended or adjusted under 35 U.S.C. 154(b) by 316 days.

(21) Appl. No.: 12/475,751

(22) Filed: Jun. 1, 2009

(65) Prior Publication Data
US 2009/0294737 A1  Dec. 3, 2009

(30) Foreign Application Priority Data

Jun. 2, 2008 (JP) .................. 2008-145073
May 28, 2009 (JP) .................. 2009-129266

(51) Int. Cl.
- H01B 1/00 (2006.01)
- G03G 15/08 (2006.01)
- G03G 21/00 (2006.01)
- C08L 27/00 (2006.01)
- C08G 67/02 (2006.01)

(52) U.S. Cl. ........ 252/500; 399/279; 399/288; 399/350; 524/567; 524/612

(58) Field of Classification Search .............. 252/500; 399/279, 288, 350; 524/567, 612
See application file for complete search history.

(56) References Cited

U.S. PATENT DOCUMENTS

| | | | | |
|---|---|---|---|---|
| 4,952,633 A | * | 8/1990 | Maeda et al. | 525/187 |
| 5,863,626 A | * | 1/1999 | Yamasaki | 428/36.5 |
| 6,534,180 B2 | * | 3/2003 | Hoshi | 428/413 |
| 2005/0261468 A1 | * | 11/2005 | Hattori et al. | 528/403 |
| 2008/0176992 A1 | * | 7/2008 | Kim | 524/554 |

FOREIGN PATENT DOCUMENTS

| | | |
|---|---|---|
| JP | 08-212828 | 8/1996 |
| JP | 10-045953 | 2/1998 |
| JP | 2003-202722 | 7/2003 |
| JP | 2004-191960 | 7/2004 |
| JP | 2004-191961 | 7/2004 |

* cited by examiner

Primary Examiner — Mark Kopec
Assistant Examiner — Jaison Thomas
(74) Attorney, Agent, or Firm — Young & Thompson

(57) ABSTRACT

The present invention provides a conductive rubber member which exhibits low electrical resistance, and has properties that are less affected by environmental factors, and excellent staining resistance. The conductive rubber member of the present invention has a base rubber predominantly containing epichlorohydrin rubber, and a conductive elastic layer which is formed, through hardening and molding of a rubber composition, wherein the rubber composition contains, as vulcanizing agents, a thiourea-type vulcanizing agent and a thiuram-type vulcanizing agent, and contains no elemental sulfur.

6 Claims, 1 Drawing Sheet

CONDUCTIVE RUBBER MEMBER

The entire disclosure of Japanese Patent Applications Nos. 2008-145073 filed Jun. 2, 2008 and 2009-129266 filed May 28, 2009 is expressly incorporated by reference herein.

BACKGROUND OF THE INVENTION

1. Field of the Invention

The present invention relates to a conductive rubber member suitable for a conductive roller (e.g., a charge-imparting roller, an image-transfer roller, a development roller, a toner-supply roller, or a cleaning roller), a cleaning blade, a transfer belt, etc., for use in an image-forming apparatus such as an electrophotographic or toner-jet-type copying machine or printer.

2. Background Art

Conductive rollers employed in image-forming apparatuses such as copying machines and printers are required to have a non-staining property to a photoreceptor and other elements, appropriate conductivity, etc.

In this regard, the present inventors previously proposed a conductive roller having an elastic layer formed of an epichlorohydrin base rubber, a surface of the layer having been treated with a treatment solution containing an isocyanate compound (see Japanese Patent No. 3444391 and Japanese Patent Application Laid-open (kokai) Nos. 2004-191960 and 2004-191961).

Addition of an ion-conductivity-imparting agent to a rubber member is one possible approach to attain lower electrical resistance. However, when an ion-conductivity-imparting agent is added in a large amount, even though a surface-treated layer has been provided, the electrical resistance of the rubber member varies considerably due to environmental factors, and bleeding of the ion-conductivity-imparting agent occurs to thereby stain a photoreceptor, in some cases.

In order to prevent bleeding of an ion-conductivity-imparting agent or to enhance permanent compressive strain and abrasive machining performance, one possible approach is to add sulfur or a sulfur-containing vulcanization accelerator. However, when such an additive is employed in a large amount, electrical resistance increases in some cases.

SUMMARY OF THE INVENTION

In view of the foregoing, an object of the present invention is to provide a conductive rubber member which exhibits low electrical resistance, and has properties that are less affected by environmental factors, and excellent, staining resistance.

In a first mode of the present invention for attaining the object, there is provided a conductive rubber member having a conductive elastic layer which is formed through molding and hardening of a rubber composition, wherein the rubber composition contains, a base rubber predominantly containing epichlorohydrin rubber and as vulcanizing agents, a thiourea-type vulcanizing agent and at least one member selected from the group consisting of thiuram-type vulcanizing agents and dithiocarbamate type vulcanizing agents, and contains no elemental sulfur.

A second mode of the present invention is drawn to a specific embodiment of the conductive rubber member according to the first mode, wherein the rubber composition contains no conductivity-imparting agent, and the conductive elastic layer has an electrical resistance, as measured under application of a voltage of 100 V and NN conditions (25° C., 50% RH), falling within a range of $5.0 \times 10^4$ to $5.0 \times 10^7$ $\Omega$.

A third mode of the present invention is drawn to a specific embodiment of the conductive rubber member according to the first or second mode, wherein the rubber composition contains no conductivity-imparting agent, and the conductive elastic layer is characterized in that an absolute value of the difference between a common logarithm of electrical resistance ($\Omega$) as measured under LL conditions (10° C., 30% RH) and that of electrical resistance ($\Omega$) as measured under HH conditions (35° C., 85% RH) is 1.5 or less, the electrical resistance being measured under application of a voltage of 100 v.

A fourth mode of the present invention is drawn to a specific embodiment of the conductive rubber member according to any of the first to third modes, wherein the epichlorohydrin rubber is a copolymer formed from epichlorohydrin and at least one member selected from among alkylene oxides and allyl glycidyl ether.

A fifth mode of the present invention is drawn to a specific embodiment of the conductive rubber member according to any of the first to fourth modes, wherein the conductive elastic layer has a surface portion assuming in the form of a surface-treated layer formed through impregnating a surface of the conductive elastic layer with a surface-treatment liquid containing at least an isocyanate component and an organic solvent.

A sixth mode of the present invention is drawn to a specific embodiment of the conductive rubber member according to the fifth mode, wherein the surface-treatment liquid further contains at least one member selected from among carbon black, an acrylic fluoropolymer, and an acrylic silicone polymer.

A seventh mode of the present invention is drawn to a specific embodiment of the conductive rubber member according to any of the first to sixth modes, which has a roller shape, a blade shape, or a belt shape.

The present invention employs a thiourea-type vulcanizing agent and at least one member selected from the group consisting of thiuram-type vulcanizing agents and dithiocarbamate-type vulcanizing agents in combination and contains no elemental sulfur. Therefore, the invention can provide a conductive rubber member which exhibits low electrical resistance, and has properties that are less affected by environmental factors, and excellent staining resistance.

DETAILED DESCRIPTION OF PREFERRED EMBODIMENTS

Figure 1:
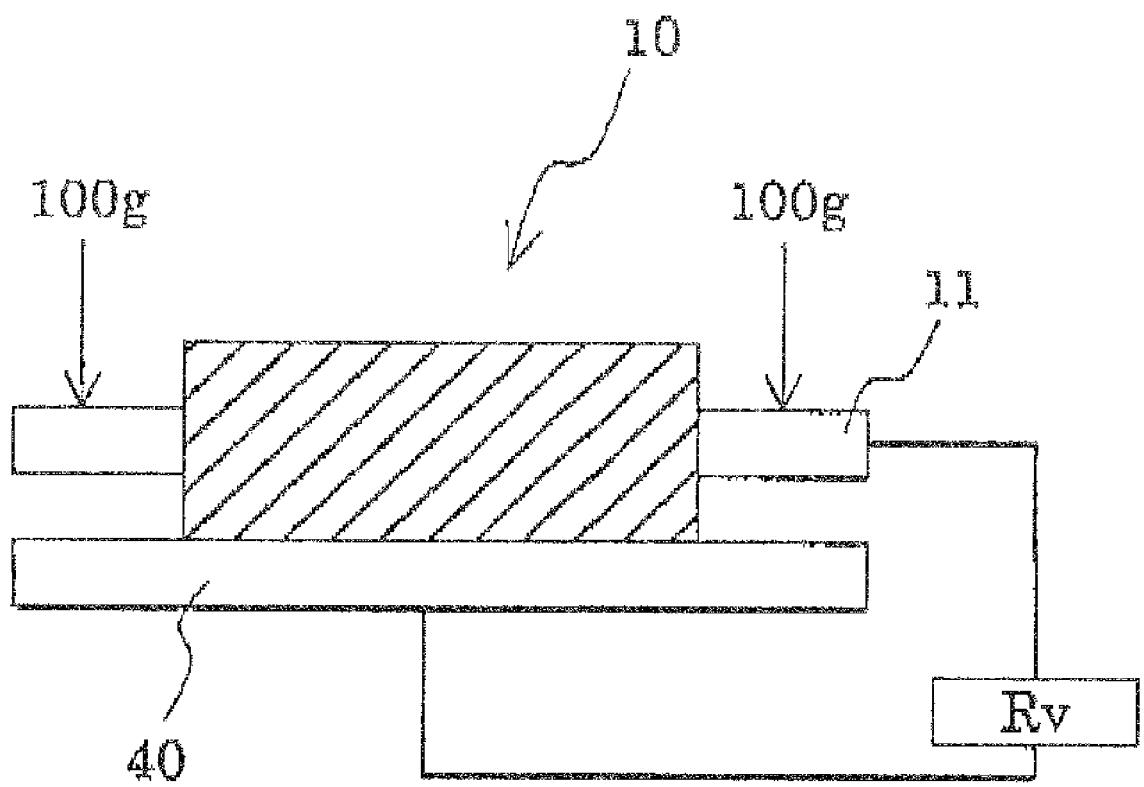
FIG. 1 is a sketch depicting the test procedure of Test Example 1.

The conductive rubber member of the present invention has a conductive elastic layer which is formed through molding and hardening of a rubber composition, wherein the rubber composition contains, a base rubber predominantly containing epichlorohydrin rubber and as vulcanizing agents, a thiourea-type vulcanizing agent and at least one member selected from the group consisting of thiuram-type vulcanizing agents and dithiocarbamate-type vulcanizing agents, and contains no elemental sulfur. The conductive rubber member of the present invention attains low electrical resistance without employing a conductivity-imparting agent such as an ion-conductivity-imparting agent or carbon black. Thus, there can be prevented bleeding of additives such as an ion-conductivity-imparting agent and elemental sulfur, and variation in electrical resistance, which would otherwise be caused by variation in temperature, humidity, and applied voltage, whereby the conductive rubber member has excellent staining resistance and properties that are less affected by environmental factors.

The rubber composition of the invention contains, as vulcanizing agents, a thiourea-type vulcanizing agent, and at least one member selected from the group consisting of thiuram-type vulcanizing agents and dithiocarbamate-type vulcanizing agents, in combination, and does not contain elemental sulfur.

The rubber composition essentially contains epichlorohydrin rubber, a thiourea-type vulcanizing agent, and a thiuram-type vulcanizing agent. In the composition, a chlorine moiety of the epichlorohydrin rubber (and C=C double bond, if present) is reacted with a thiourea-type vulcanizing agent and a thiuram-type vulcanizing agent, whereby cross-linking proceeds. In the cross-linking process, sulfur is released from the thiuram-type vulcanizing agent through heating, and the sulfur-released thiuram-type vulcanizing agent forms a salt with chloride released from the epichlorohydrin rubber. The thiuram-type vulcanizing agent reacts with a metal compound (e.g., zinc flower) contained in the rubber composition and with released sulfur, to thereby form a pendant moiety bound to a rubber molecule. As used herein, the term "pendant moiety" refers to a moiety formed of a residue of a thiuram-type vulcanizing agent having a lone pair on a nitrogen atom, which residue is attached to a molecular chain of epichlorohydrin rubber. Since this polymer structure, or a salt-like moiety, possibly serves as a conductivity-imparting agent, the conductive rubber member exhibits low electrical resistance. Notably, if the rubber composition contains only a thiourea-type vulcanizing agent or a thiuram-type vulcanizing agent as a single vulcanizing agent, low electrical resistance cannot be attained. In addition, incorporation of elemental sulfur into the rubber composition elevates cross-linking density, resulting in elevation of electrical resistance.

The conductive rubber member contains, in combination, a thiourea-type vulcanizing agent and a thiuram-type vulcanizing agent, whereby an appropriate hardness and excellent staining resistance can be attained. More specifically, incorporation of a thiourea-type vulcanizing agent results in an appropriate hardness, whereas incorporation of a thiuram-type vulcanizing agent leads to excellent staining resistance.

The base rubber employed in the present invention is mainly formed from epichlorohydrin rubber. The epichlorohydrin rubber is preferably a copolymer formed from epichlorohydrin and at least one member selected from alkylene oxides and allyl glycidyl ether. Specifically, the epichlorohydrin rubber is preferably at least one member selected from among epichlorohydrin-ethylene oxide copolymer, epichlorohydrin-allyl glycidyl ether copolymer, epichlorohydrin-ethylene oxide-allyl glycidyl ether terpolymer, and derivatives thereof. Notably, needless to say, these copolymer species may be used in combination. In the case where a terpolymer is employed as epichlorohydrin rubber, sulfur released from a thiuram-type vulcanizing agent may react with a C=C double bond of the epichlorohydrin rubber, to thereby form sulfur-mediated cross-linking, which leads to excellent staining resistance. In the case where a bi-component copolymer is employed, the produced conductive rubber member exhibits lower electrical resistance as compared with the case where a terpolymer is employed.

No particular limitation is imposed on the base rubber, so long as it is mainly formed of the aforementioned epichlorohydrin rubber. The base rubber may be appropriately blended with other rubber materials. Examples of the base rubber include epichlorohydrin homopolymer, polyurethane, acrylonitrile-butadine rubber (NBR), chloroprene rubber (CR), and stryrene rubber (SBR).

Specific examples of the thiourea-type vulcanizing agent include ethylene thiourea, diethyl thiourea, dibutyl thiourea, diphenyl thiourea, and trimethyl thiourea. Among them, those having a relatively low molecular weight such as ethylene thiourea and trimethyl thiourea are preferred by virtue of high reactivity.

Examples of the thiuram-type vulcanizing agent include TMTD (tetramethylthiuram disulfide), TETD (tetraethylthiuram disulfide), TBTD (tetrabutylthiuram disulfide), DPTT (dipentamethylenethiuram tetrasulfide), and TBZTD (tetrabenzylthiuram disulfide). Among them, those having a relatively low molecular weight is preferred from the viewpoint of reduction of electrical resistance, although they may cause blooming. Particularly, TMTD (tetramethylthiuram disulfide) and TETD (tetraethylthiuram disulfide) are preferred.

Alternatively, the thiuram-type vulcanizing agent may be changed to a dithiocarbamate-type vulcanizing agent. The dithiocarbamate-type vulcanizing agent is a type of metal salt having the same structure as that of a reaction residue of a thiuram-type vulcanizing agent. Similar to the thiuram-type vulcanizing agent, the dithiocarbamate-type vulcanizing agent forms a pendant moiety attached to a rubber molecule, or a salt with chlorine released from epichlorohydrin rubber. Therefore, the same effect as obtained by use of the thiuram-type vulcanizing agent can be attained. Examples of the dithiocarbamate-type vulcanizing agent include ZnMDC (zinc dimethyldithiocarbamate), ZnEDC (zinc diethyldithiocarbamate), CuMDC (copper dimethyldithiocarbamate), and NaEDC (sodium diethyldithiocarbamate).

Needless to say, the dithiocarbamate-type vulcanizing agent and the thiuram-type vulcanizing agent may be used in combination.

Preferably, the thiourea-type vulcanizing agent is used in an amount of 0.3 to 5 parts, and the thiuram-type vulcanizing agent and the dithiocarbamate-type vulcanizing agent are used in a total amount of 0.1 to 5 parts, with respect to 100 parts of the base rubber. The ratio by mass of the amount of the thiourea-type vulcanizing agent to the total amount of the thiuram-type vulcanizing agent and the dithiocarbamate-type vulcanizing agent is preferably adjusted to 5:1 to 1:1.

The rubber composition of the invention preferably contains zinc flower, for reducing the permanent compressive strain and maintaining the electrical resistance at a low level.

The rubber composition of the present invention preferably contains morpholine disulfide, for reducing the permanent compressive strain and enhancing moldability such as abrasive machining performance.

The rubber composition of the invention preferably contains a triazine compound. Specific examples include 2,3,6-trimercaptohyl-S-triazine. Through incorporation of a triazine compound into the rubber composition, vulcanization can be accelerated, resulting in shortening of vulcanization time.

The conductive elastic layer, produced through molding and hardening of the aforementioned rubber composition, has an electrical resistance, as measured under application of a voltage of 100 V and NN conditions (25° C., 50% RH), falling within a range of $5.0 \times 10^4$ to $5.0 \times 10^7$ Ω, preferably a range of $5.0 \times 10^4$ to $5.0 \times 10^6$ Ω. The conductive elastic layer is characterized in that an absolute value of the difference between a common logarithm of electrical resistance (Ω) as measured under LL conditions (10° C., 30% RH) and that of electrical resistance (Ω) as measured under HH conditions (35° C., 85% RH) is 1.5 or less, the electrical resistance being measured under application of a voltage of 100 V.

The electrical resistance of the conductive rubber member of the present invention can be reduced without using a conductivity-imparting agent such as an ion-conductivity-imparting agent or carbon black. However, needless to say, the electrical resistance may further be reduced through addition of an ion-conductivity-imparting agent, carbon black, etc. Specifically, through addition of a small amount of an ion-conductivity-imparting agent or carbon black to the aforementioned rubber composition, the electrical resistance of the formed conductive elastic layer can be more reduced. In other words, through addition of an ion-conductivity-imparting agent or carbon black in an amount smaller than that conventionally employed to the rubber composition of the present invention, the electrical resistance of the formed conductive elastic layer can be adjusted to a level of interest. More specifically, when an ion-conductivity-imparting agent (1 part or less) is added to a base rubber (100 parts), electrical resistance more decreases, i.e., the absolute value of the difference between a common logarithm of electrical resistance (before addition) and electrical resistance (after addition) becomes about 0.5.

When a conductivity-imparting material is employed, the material is preferably selected from among carbon black species. Other than carbon black species, an electron-conductivity-imparting material such as metallic powder, an ion-conductivity-imparting agent, or a mixture thereof may be used.

Examples of the ion-conductivity-imparting agent include an organic salt, an inorganic salt, a metal complex, and an ionic liquid. Examples of the organic salt and inorganic salt include lithium perchlorate, a quaternary ammonium salt, and sodium trifluoroacetate. Examples of the metal complex include ferric halide-ethylene glycol. A more specific example is a diethylene glycol-ferric chloride complex disclosed in Japanese Patent No. 3655364. Meanwhile, ionic liquid, which is also called ambient-temperature molten salt, is a molten salt which is liquid at room temperature, particularly having a melting point of 70° C. or lower, preferably 30° C. or lower. Specific examples of ionic liquid include 1-ethyl-3-methylimidazolium bis(trifluoromethylsulfonyl)imide and 1-butyl-3-ethylimidazolium trifluoromethylsulfonyl)imide, which are disclosed in Japanese Patent Application Laid-Open (kokai) No. 2003-202722.

The conductive elastic layer has a surface portion assuming in the form of a surface-treated layer formed through impregnating a surface of the conductive elastic layer with a surface-treatment liquid containing at least an isocyanate component and an organic solvent.

The surface-treatment liquid is based on an organic solvent in which at least an isocyanate component has been dissolved.

Examples of the isocyanate component contained in the first surface-treatment liquid include isocyanate compounds such as 2,6-tolylene diisocyanate (TDI), 4,4'-diphenylmethane diisocyanate (MDI), p-phenylene diisocyanate (PPDI), 1,5-naphthalene diisocyanate (NDI), 3,3-dimethyldiphenyl-4,4'-diisocyanate (TODI), and modified products and oligomers thereof. A prepolymer formed from a polyol and an isocyanate may also be employed.

The surface-treatment liquid may further contain polyether polymer. The polyether polymer is preferably soluble in organic solvent and has active hydrogen, which reacts with an isocyanate to form a chemical bond.

A preferred polyether polymer having active hydrogen is, for example, epichlorohydrin rubber. The epichlorohydrin rubber used herein refers to unvulcanized epichlorohydrin rubber. Epichlorohydrin rubber is preferably used, since it can impart conductivity and elasticity to the surface-treated layer. Notably, epichlorohydrin rubber per se has active hydrogen (hydroxyl group) at an end. Epichlorohydrin rubber having in a repeating unit active hydrogen such as a hydroxyl group or an allyl group is also preferred. Examples of the epichlorohydrin rubber include epichlorohydrin homopolymer, epichlorohydrin-ethylene oxide copolymer, epichlorohydrin-ally glycidyl ether copolymer, epichlorohydrin-ethylene oxide-allyl glycidyl ether terpolymer, and derivatives thereof.

Examples of other suitable polyether polymers having active hydrogen include those having a hydroxyl group or an allyl group. Specific examples include polyols and glycols. Such polyether polymers preferably include active hydrogen at one end rather than at both ends. The polyether polymer preferably has a number average molecular weight of 300 to 1,000, from the viewpoint of imparting elasticity to the surface-treated layer. Examples of such polyether polymers include polyalkylene glycol monomethyl ether, polyalkylene glycol dimethyl ether, allylated polyether, polyalkylene glycol diol, and polyalkylene glycol triol.

Through incorporation of polyether polymer into the surface-treatment liquid, the surface-treated layer formed therefrom has improves softness and strength. As a result, wearing of the surface of a roller of interest and damage of the surface of a counter photoreceptor can be prevented.

The surface-treatment liquid may further contain a polymer at least one member selected from among an acrylic fluoropolymer and an acrylic silicone polymer.

The acrylic fluoropolymer and acrylic silicone polymer employed in the surface-treatment liquid can be dissolved in a specific solvent and can be reacted with isocyanate to form a chemical bond. The acrylic fluoropolymer is a fluorine-containing polymer which has, for example, a hydroxyl group, an alkyl group, or a carboxyl group, and can be dissolved in a solvent. Examples include a block copolymer of an acrylic acid ester and a fluoroalkyl acrylate, and derivatives thereof. The acrylic silicone polymer is a silicone-base polymer which is soluble in a solvent. Examples include a block copolymer of an acrylic acid ester and a siloxane acrylate, and derivatives thereof.

The surface-treatment liquid may further contain, as a conductivity-imparting material, carbon black such as Acetylene Black, Ketjen Black, or Toka Black. Since the electrical resistance of the conductive elastic layer of the present invention can readily be reduced through addition of only a small amount of carbon black, the amount of carbon black added to the surface-treatment liquid may be small.

The amounts of the acrylic fluoropolymer and acrylic silicone polymer employed in the surface-treatment liquid are preferably such that the total amount of the polymers is adjusted to 10 to 70 mass % with respect to isocyanate. When the total amount is less than 10 mass %, the surface-treated layer performs poorly in retaining additives such as carbon black, whereas when the polymer amount is in excess of 70 mass %, electrical resistance increases, thereby impairing electric discharge characteristics, and the relative isocyanate amount decreases, thereby failing to form an effective surface-treated layer, which are problematic.

The surface-treatment liquid contains an organic solvent which can dissolve an isocyanate component and an optional component selected from among a polyether polymers, an acrylic fluoropolymer, and an acrylic silicone polymer. No particular limitation is imposed on the organic solvent, and ethyl acetate, methyl ethyl ketone (MEK), toluene, etc. may be used as an organic solvent.

The surface-treated layer may be formed by immersing the conductive elastic layer in a surface-treatment liquid, or by applying a surface-treatment liquid onto the elastic layer through, for example, spray coating, followed by drying to harden the liquid. A surface portion of the conductive elastic layer is impregnated with the surface-treatment liquid, whereby a surface-treated layer can be formed integrally with the conductive elastic layer. The surface-treated layer is formed mainly from hardened isocyanate. The layer is formed such that the isocyanate component density gradually decreases from the top surface to the inside thereof. Therefore, bleeding of staining substances to the surface of the conductive rubber member can be effectively prevented, whereby the conductive rubber member has excellent resistance to staining to a counter member (photoreceptor).

The conductive rubber member according to the present invention is suitable for rollers, blades, belts, etc., particularly suitable for a charge-imparting roller, an image-transfer roller, a development roller, a toner-supply roller, a cleaning roller, a cleaning blade, a transfer belt, etc.

The present invention will next be described in detail by way of examples, which should not be construed as limiting the invention thereto. Unless otherwise specified, the unit "part(s)" represents "part(s) by mass."

EXAMPLE 1

Production of Roller

Epichlorohydrin-ethylene oxide-allyl glycidyl ether terpolymer (EPION 301, product of Daiso Co., Ltd.) (100 parts), zinc flower (5 parts), stearic acid (2 parts), a thiourea-type vulcanizing agent (Accel 22-S; Kawaguchi Chemical Industry Co., Ltd.) (1 part), and TMTD (tetramethylthiuram disulfide) (1 part) were kneaded by means of a roll mixer, and the kneaded product was press-formed on the surface of a metallic shaft (diameter; 6 mm). The outer surface of the thus-coated shaft was machined with abrasive, to thereby adjust the thickness of the rubber layer to 1.5 mm, whereby a roller member (diameter: 9 mm) was produced. The roller member was employed as an Example 1 conductive roller.

EXAMPLE 2

Preparation of Surface-Treatment Liquid

An isocyanate compound (MDI) (20 parts) was added to and dissolved in ethyl acetate (100 parts), to thereby prepare a surface-treatment liquid.

Surface-Treatment of a Roller

The Example 1 roller member was immersed for 60 seconds in the thus-prepared surface-treatment liquid maintained at 23° C., and subsequently heated for one hour in an oven maintained at 120° C., to thereby form a surface-treated layer. The thus-treated roller member was employed as an Example 2 conductive roller.

EXAMPLE 3

The procedure of Example 2 was repeated, except that TETD (tetraethylthiuram disulfide) (1 part) was used instead of TMTD (tetramethylthiuram disulfide) (1 part), to thereby produce an Example 3 conductive roller.

EXAMPLE 4

The procedure of Example 2 was repeated, except that TBTD (tetrabutylthiuram disulfide) (1 part) was used instead of TMTD (tetramethylthiuram disulfide) (1 part), to thereby produce an Example 4 conductive roller.

EXAMPLE 5

The procedure of Example 2 was repeated, except that DPTT (dipentamethylenethiuram tetrasulfide) (1 part) was used instead of TMTD (tetramethylthiuram disulfide) (1 part), to thereby produce an Example 5 conductive roller.

EXAMPLE 6

The procedure of Example 2 was repeated, except that epichlorohydrin-ethylene oxide copolymer (Epichlomer D, product of Daiso Co., Ltd.) (100 parts) was used instead of epichlorohydrin-ethylene oxide-allyl glycidyl ether terpolymer (EPION 301, product of Daiso Co., Ltd.) (100 parts), to thereby produce an Example 6 conductive roller.

EXAMPLE 7

Preparation of Surface-Treatment Liquid

Ethyl acetate (100 parts), Acetylene Black (product of Denki Kagaku Kogyo K.K.) (4 parts), and an acrylic fluoropolymer (Modiper F600, product of Nippon Oil & Fats Co., Ltd.) (2 parts) were mixed by means of a ball mill for three hours, to thereby produce a uniform mixture. An isocyanate compound (MDI) (20 parts) was added to and dissolved in the thus-produced mixture, to thereby prepare a surface-treatment liquid.

Surface-Treatment of a Roller

The Example 1 roller member was immersed for 60 seconds in the thus-prepared surface-treatment liquid maintained at 23° C., and subsequently heated for one hour in an oven maintained at 120° C., to thereby form a surface-treated layer. The thus-treated roller member was employed as an Example 7 conductive roller.

EXAMPLE 8

Preparation of Surface-Treatment Liquid

Ethyl acetate (100 parts), Acetylene Black (product of Denki Kagaku Kogyo K.K.) (4 parts), and an acrylic silicone polymer (Modiper FS700, product of Nippon Oil & Fats Co., Ltd.) (2 parts) were mixed by means of a ball mill for three hours, to thereby produce a uniform mixture. An isocyanate compound (MDI) (20 parts) was added to and dissolved in the thus-produced mixture, to thereby prepare a surface-treatment liquid.

Surface-Treatment of a Roller

The Example 1 roller member was immersed for 60 seconds in the thus-prepared surface-treatment liquid maintained at 23° C., and subsequently heated for one hour in an oven maintained at 120° C., to thereby form a surface-treated layer. The thus-treated roller member was employed as an Example 8 conductive roller.

EXAMPLE 9

The procedure of Example 7 was repeated, except that TETD (tetraethylthiuram disulfide) (1 part) was used instead of TMTD (tetramethylthiuram disulfide) (1 part), to thereby produce an Example 3 conductive roller.

COMPARATIVE EXAMPLE 1

The procedure of Example 2 was repeated, except that TMTD (tetramethylthiuram disulfide) (3 parts) was used in place of a thiourea-type vulcanizing agent, to thereby produce a Comparative Example 1 conductive roller.

COMPARATIVE EXAMPLE 2

The procedure of Example 6 was repeated, except that a thiourea-type vulcanizing agent (1.5 parts) was used in place of DPTT, to thereby produce a Comparative Example 2 conductive roller.

COMPARATIVE EXAMPLE 3

The procedure of Example 2 was repeated, except that sulfur (1 part) was used instead of the thiourea-type vulcanizing agent (1 part), and MBTS (dibensothiazole disulfide) (1 part) and an ion-conductivity-imparting agent (ammonium perchlorate) (1 part) were further used, to thereby produce a Comparative Example 3 conductive roller.

COMPARATIVE EXAMPLE 4

The procedure of Comparative Example 2 was repeated, except that an ion-conductivity-imparting agent (ammonium perchlorate) (1 part) was further used, to thereby produce a Comparative Example 4 conductive roller.

COMPARATIVE EXAMPLE 5

The procedure of Comparative Example 3 was repeated, except that a thiourea-type vulcanizing agent (1 part) was further used, and the amount of ion-conductivity-imparting agent (ammonium perchlorate) was changed to 1.2 parts, to thereby produce a Comparative Example 5 conductive roller.

TEST EXAMPLE 1

Measurement of Electrical Resistance

The electrical resistance of each of the conductive rollers produced in the Examples and Comparative Examples was measured. As shown in FIG. 1, electrical resistance was measured in the following manner. Specifically, a conductive roller 10 was placed on an electrode member 40 formed of a SUS 304 plate, and a load of 100 g was applied to each end of a metal shaft 11. In this state, electrical resistance between the metal shaft 11 and the electrode member 40 was measured by means of ULTRA HIGH RESISTANCE METER R8340A (product of Advantest) under low temperature-low humidity conditions (LL: 10° C., 30% RH), normal temperature-normal humidity conditions (NN: 25° C., 50% RH), and high temperature-high humidity conditions (HH: 35° C., 85% RH). The voltage applied during measurement was DC-100 V. The results are shown in Tables 1 and 2.

TEST EXAMPLE 2

Image Evaluation

Each of the conductive rollers produced in the Examples and Comparative Examples and serving as charge-imparting rollers was installed in a commercial printer (MICROLINE 9600PS, product of Oki Data). An image was output by operating the printer under low temperature-low humidity conditions (LL: 10° C., 30% RH), normal temperature-normal humidity conditions (NN; 25° C., 50% RH), and high temperature-high humidity conditions (HH: 35° C., 85% RH), and the quality of the output images was evaluated in terms of the following ratings: excellent (O) and bad (X). The rating "bad" refers to an image in which unevenness in color density, deterioration, etc. were observed. Through a change in electrical resistance between under LL conditions and under HH conditions, stability of electrical resistance against environmental change (hereinafter may be referred to as environmental stability) was evaluated. The results are also shown in Tables 1 and 2.

TEST EXAMPLE 3

OPC Staining Test

Each of the conductive rollers produced in Examples 2 to 6 and the Comparative Examples and serving as charge-imparting rollers was attached to a toner cartridge of a commercial laser-beam printer and caused to contact a photoreceptor under a pressure of 500 gf. The cartridge was allowed to stand for 30 days under the conditions of 50° C. and 90% RH. Thereafter, the cartridge and the charge-imparting roller were installed in the printer, and image output was performed. The surface of the OPC which the roller contacted was observed under a microscope. The results are also shown in Tables 1 and 2.

TABLE 1

|  |  | Ex. 1 | Ex. 2 | Ex. 3 | Ex. 4 | Ex. 5 |
|---|---|---|---|---|---|---|
| Base rubber (parts) | terpolymer | 100 | 100 | 100 | 100 | 100 |
|  | bipolymer |  |  |  |  |  |
| Stearic acid (parts) |  | 2 | 2 | 2 | 2 | 2 |
| Zinc flower (parts) |  | 5 | 5 | 5 | 5 | 5 |
| Thiourea vulcanizer (parts) |  | 1 | 1 | 1 | 1 | 1 |
| Thiuram Vulcanizer (parts) | TMTD | 1 | 1 |  |  |  |
|  | TETD |  |  | 1 |  |  |
|  | TBTD |  |  |  | 1 |  |
|  | DPTT |  |  |  |  | 1 |
| MBTS (parts) |  |  |  |  |  |  |
| Sulfur (parts) |  |  |  |  |  |  |
| Ion-conductor (parts) |  |  |  |  |  |  |
| Abrasive machinability |  | excellent | excellent | excellent | excellent | excellent |
| Surface treatment |  | no | yes | yes | yes | yes |
| Isocyanate |  |  | 20 | 20 | 20 | 20 |
| Acylic fluoropolymer |  |  |  |  |  |  |
| Acrylic silicone polymer |  |  |  |  |  |  |
| Carbon black |  |  |  |  |  |  |
| Volume resistivity ($\log\Omega$) | HH | 4.4 | 4.8 | 4.8 | 5.0 | 5.0 |
|  | NN | 4.9 | 5.3 | 5.2 | 5.5 | 5.5 |
|  | LL | 5.5 | 5.9 | 5.8 | 6.1 | 6.2 |

TABLE 1-continued

|  |  |  | Ex. 6 | Ex. 7 | Ex. 8 | Ex. 9 |
|---|---|---|---|---|---|---|
| Stability | LL – HH |  | 1.1 | 1.1 | 1.0 | 1.1 | 1.2 |
| Image evaluation | HH |  | — | ○ | ○ | ○ | ○ |
|  | NN |  | — | ○ | ○ | ○ | ○ |
|  | LL |  | — | ○ | ○ | ○ | ○ |
| OPC surface |  |  | — | excellent | excellent | excellent | excellent |

|  |  | Ex. 6 | Ex. 7 | Ex. 8 | Ex. 9 |
|---|---|---|---|---|---|
| Base rubber (parts) | terpolymer |  | 100 | 100 | 100 |
|  | bipolymer | 100 |  |  |  |
| Stearic acid (parts) |  | 2 | 2 | 2 | 2 |
| Zinc flower (parts) |  | 5 | 5 | 5 | 5 |
| Thiourea vulcanizer (parts) |  | 1 | 1 | 1 | 1 |
| Thiuram Vulcanizer (parts) | TMTD | 1 | 1 | 1 |  |
|  | TETD |  |  |  | 1 |
|  | TBTD |  |  |  |  |
|  | DPTT |  |  |  |  |
| MBTS (parts) |  |  |  |  |  |
| Sulfur (parts) |  |  |  |  |  |
| Ion-conductor (parts) |  |  |  |  |  |
| Abrasive machinability |  | excellent | excellent | excellent | excellent |
| Surface treatment |  | yes | yes | yes | yes |
| Isocyanate |  | 20 | 20 | 20 | 20 |
| Acylic fluoropolymer |  |  | 2 |  | 2 |
| Acrylic silicone polymer |  |  |  | 2 |  |
| Carbon black |  |  | 4 | 4 | 4 |
| Volume resistivity (logΩ) | HH | 4.8 | 4.9 | 4.9 | 5.1 |
|  | NN | 5.1 | 5.3 | 5.2 | 5.5 |
|  | LL | 5.7 | 5.7 | 5.6 | 6.0 |
| Stability | LL – HH | 0.9 | 0.8 | 0.7 | 0.9 |
| Image evaluation | HH | ○ | ○ | ○ | ○ |
|  | NN | ○ | ○ | ○ | ○ |
|  | LL | ○ | ○ | ○ | ○ |
| OPC surface |  | excellent | excellent | excellent | excellent |

TABLE 2

|  |  | Comp. Ex. 1 | Comp. Ex. 2 | Comp. Ex. 3 | Comp. Ex. 4 | Comp. Ex. 5 |
|---|---|---|---|---|---|---|
| Base rubber (parts) | terpolymer | 100 |  | 100 |  | 100 |
|  | bipolymer |  | 100 |  | 100 |  |
| Stearic acid (parts) |  | 2 | 2 | 2 | 2 | 2 |
| zinc flower (parts) |  | 5 | 5 | 5 | 5 | 5 |
| Thiourea vulcanizer (parts) |  |  | 1.5 |  | 1.5 | 1 |
| Thiuram vulcanizer (parts) | TMTD | 3 |  | 1 |  | 1 |
|  | TETD |  |  |  |  |  |
|  | TBTD |  |  |  |  |  |
|  | DPTT |  |  |  |  |  |
| MBTS (parts) |  |  |  | 1 |  | 1 |
| Sulfur (parts) |  |  |  | 1 |  | 1 |
| Ion-conductor (parts) |  |  |  | 1 | 1 | 1.2 |
| Abrasive machinability |  | bad | excellent | bad | excellent | excellent |
| Surface treatment |  | yes | yes | yes | yes | yes |
| Isocyanate |  | 20 | 20 | 20 | 20 | 20 |
| Acylic fluoropolymer |  |  |  |  |  |  |
| Acrylic silicone polymer |  |  |  |  |  |  |
| Carbon black |  |  |  |  |  |  |
| Volume resistivity (logΩ) | HH | 5.0 | 5.0 | 4.6 | 4.5 | 4.5 |
|  | NN | 5.8 | 5.8 | 5.2 | 5.2 | 5.1 |
|  | LL | 6.7 | 6.8 | 6.2 | 6.1 | 6.0 |
| Stability | LL – HH | 1.7 | 1.8 | 1.6 | 1.6 | 1.5 |
| Image evaluation | HH | Δ (image defects) | ○ | Δ (image defects) | ○ | ○ |
|  | NN | Δ (image defects) | ○ | Δ (image defects) | ○ | ○ |
|  | LL | X (image defects) | X | X (image defects) | ○ | ○ |
| OPC surface |  | excellent | stained | stained | stained | stained |

Results

All roller members of Examples 1 to 9 were satisfactorily machined with abrasives, whereas roller members of Comparative Examples 1 and 3, which had been produced from a rubber composition containing no thiourea-type vulcanizing agent, exhibited poor abrasive machinability possibly due to low hardness.

The conductive roller of Example 1 exhibited low electrical resistance under all tested conditions. The conductive roller of Example 2, which had received surface treatment, exhibited under all tested conditions an electrical resistance which is lower than that of the conductive roller of Comparative Example 1, which had been produced from a rubber composition containing no thiourea-type vulcanizing agent. The conductive roller of Example 6 exhibited under all tested conditions an electrical resistance which is lower than that of the conductive roller of Comparative Example 2, which had been produced from a rubber composition containing no thiuram-type vulcanizing agent. Therefore, use of a thiourea-type vulcanizing agent and a thiuram-type vulcanizing agent in combination has been found to reduce electrical resistance.

In Examples 1 to 3 and 6 employing TMTD and TETD, having a lower molecular weight, the conductive rollers exhibited remarkably low electrical resistance.

The conductive roller of Example 2 exhibited an electrical resistance almost equivalent to or less than that of the conductive rollers of Comparative Examples 3 and 5, which had been produced from a rubber composition containing elemental sulfur and an ion-conductivity-imparting agent.

The conductive rollers of Examples 1 to 6 exhibited virtually constant electrical resistance under all tested conditions (LL, NN, and HH), indicating that the conductive rollers were not affected by environmental factors. The conductive rollers of Examples 7, 8, and 9, which had received surface treatment with a surface-treatment liquid containing carbon black, were less affected by environmental factors, as compared with the conductive rollers of Examples 2 and 3.

In contrast, the conductive rollers of Comparative Examples 1 and 2 exhibited a large drop in electrical resistance under HH conditions, and a large increase under LL conditions. The conductive rollers of Comparative Examples 3 to 5, which had been produced from a rubber composition containing an ion-conductivity-imparting agent, exhibited a large increase in electrical resistance under LL conditions. Thus, the conductive rollers of Comparative Examples 1 to 5 were considerably affected by environmental factors.

The conductive rollers of Comparative Examples 1 and 2, exhibiting a large increase in electrical resistance under LL conditions, provided poor printed images under LL conditions. In the printed images produced by means of the conductive roller of Comparative Example 1, image defects caused by unevenness in the polished surface were observed under all tested conditions. The unevenness might be attributed to poor abrasive-machinability. The conductive roller of Comparative Example 3, which had been produced from a rubber composition containing an ion-conductivity-imparting agent, was less affected by environmental factors, as compared with Comparative Example 1. However, in the produced printed images, image defects caused by unevenness in the polished surface attributed to poor abrasive-machinability were observed under all tested conditions.

The conductive rollers of Comparative Examples 2 and 4, which had been produced from a rubber composition containing a thiourea-type vulcanizing agent as a sole vulcanizing agent and no thiuram-type vulcanizing agent, stained the surface of the OPC employed. In contrast, the conductive rollers of Examples 2 to 9, which had been produced from a rubber composition containing a thiourea-type vulcanizing agent and a thiuram-type vulcanizing agent in combination, did not stain the OPC surface. The conductive roller of Comparative Example 5, which had been produced from a rubber composition containing a thiourea-type vulcanizing agent, a thiuram-type vulcanizing agent, and elemental sulfur, and an ion-conductivity-imparting agent for reducing electrical resistance, stained the OPC surface.

The conductive rollers of Examples 1 to 5 and 7 to 9, employing an epichlorohydrin terpolymer rubber exhibited more excellent staining resistance than that of the conductive roller of Example 6, employing an epichlorohydrin bipolymer rubber.

What is claimed is:

1. A conductive rubber member having a conductive elastic layer which is formed through molding and hardening of a rubber composition,
    wherein the rubber composition contains a base rubber comprising epichlorohydrin rubber and as vulcanizing agents, a thiourea-type vulcanizing agent and at least one member selected from the group consisting of thiuram-type vulcanizing agents and dithiocarbamate-type vulcanizing agents, and contains neither elemental sulfur nor any conductivity-imparting agent, and
    the conductive elastic layer has an electrical resistance, as measured under application of a voltage of 100 V and NN conditions (25° C., 50% RH), falling within a range of $5.0 \times 10^4$ to $5.0 \times 10^7$ $\Omega$.

2. The conductive rubber member according to claim 1, wherein the rubber composition contains no conductivity-imparting agent, and the conductive elastic layer is characterized in that an absolute value of the difference between a common logarithm of electrical resistance ($\Omega$) as measured under LL conditions (10° C., 30% RH) and that of electrical resistance ($\Omega$) as measured under NN conditions (35° C., 85% RH) is 1.5 or less, the electrical resistance being measured under application of a voltage of 100 V.

3. The conductive rubber member according to claim 1, wherein the epichlorohydrin rubber is a copolymer formed from epichlorohydrin and at least one member selected from the group consisting of alkylene oxides and allyl glycidyl ether.

4. The conductive rubber member according to claim 1, wherein the conductive elastic layer has a surface portion assuming in the form of a surface-treated layer formed through impregnating a surface of the conductive elastic layer with a surface-treatment liquid containing at least an isocyanate component and an organic solvent.

5. The conductive rubber member according to claim 4, wherein the surface-treatment liquid further contains at least one member selected from the group consisting of carbon black, an acrylic fluoropolymer, and an acrylic silicone polymer.

6. The conductive rubber member according to claim 1, which has a roller shape, a blade shape, or a belt shape.

* * * * *